(12) United States Patent
Cheng et al.

(10) Patent No.: US 7,670,071 B2
(45) Date of Patent: Mar. 2, 2010

(54) OBJECTIVE HOLDER FOR CAMERA MODULE

(75) Inventors: Su-Jen Cheng, Taipei Hsien (TW); Wen-Ching Lai, Taipei Hsien (TW); Wen-Chang Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 257 days.

(21) Appl. No.: 11/950,391

(22) Filed: Dec. 4, 2007

(65) Prior Publication Data
US 2009/0052887 A1 Feb. 26, 2009

(30) Foreign Application Priority Data
Aug. 24, 2007 (CN) .................. 2007 1 0201455

(51) Int. Cl.
*G03B 17/00* (2006.01)
*G03B 17/02* (2006.01)
(52) U.S. Cl. .................. 396/529; 396/535; 396/541; 348/374
(58) Field of Classification Search .................. 396/529
See application file for complete search history.

(56) References Cited

U.S. PATENT DOCUMENTS

| | | | | |
|---|---|---|---|---|
| 7,456,483 B2 * | 11/2008 | Tsukamoto et al. | ......... | 257/433 |
| 7,515,202 B2 * | 4/2009 | Saito et al. | .................. | 348/374 |
| 2002/0140836 A1 * | 10/2002 | Miyake et al. | .............. | 348/340 |
| 2004/0247311 A1 * | 12/2004 | Ajiki et al. | ................... | 396/535 |
| 2005/0116138 A1 * | 6/2005 | Hanada et al. | .............. | 250/206 |
| 2007/0217786 A1 * | 9/2007 | Cho et al. | ................... | 396/542 |
| 2008/0122967 A1 * | 5/2008 | Huang | ........................ | 348/340 |

FOREIGN PATENT DOCUMENTS

| | | |
|---|---|---|
| CN | 2599759 Y | 1/2004 |
| CN | 2746536 Y | 12/2005 |
| CN | 2899330 Y | 5/2007 |
| KR | 2005103035 A * | 4/2004 |

* cited by examiner

*Primary Examiner*—Clayton Laballe
*Assistant Examiner*—Bret Adams
(74) *Attorney, Agent, or Firm*—Zhigang Ma

(57) ABSTRACT

An exemplary objective holder engages with a PCB substrate having an image sensor and several passive components arranged thereon. The passive components surround the image sensor. The objective includes a lens barrel extending from a side of a base, and a plurality of walls extending from an opposite side of the base. The walls enclose a chamber thereamong for receiving the image sensor and define notches therein for receiving the passive components therein. A transparent cover is received in the objective holder between the lens barrel and the chamber. An adhesive is used to connect the objective holder to the PCB substrate. The PCB substrate is rested on the walls. At least one of the notches communicates the chamber to an exterior for outgassing and is sealed by a mass of sealing material after a heating process of the adhesive.

13 Claims, 6 Drawing Sheets

OBJECTIVE HOLDER FOR CAMERA MODULE

CROSS-REFERENCE OF RELATED APPLICATION

This application is related to a co-pending U.S. patent application Ser. No. 11/947,081, entitled "OBJECTIVE HOLDER FOR CAMERA MODULE", which was filed on Nov. 29, 2007 and assigned to the same assignee. The disclosure of the above identified application is incorporated herein by reference.

BACKGROUND

1. Technical Field

The present invention relates to objective holders and, particularly, to an objective holder for a camera module having a compact configuration.

2. Description of Related Art

In digital cameras, objective holders are in widespread use to support lenses and other components such as image sensors. Another use for objective holders is in some compact imaging apparatus as a cover for imaging components. Typically, a lens holder comprises a lens barrel in a front thereof and defines a chamber in a rear thereof for receiving an image sensing IC and passive components therein. The image sensing IC and the passive components are generally arranged on a printed circuit board (PCB) substrate. The passive components surround the image sensing IC and are separated from the image sensing IC and the objective holder for effectively dissipating heat and avoiding EMI. The size of the chamber must be large enough to accommodate the image sensing IC and the passive components therein. Therefore, the objective holder is bulky.

Typically, the PCB substrate and the objective holder are assembled together by use of adhesive. In order to achieve better adhesive effect, the adhesive generally needs to be heated. A great deal of gas is given off, raising pressure in the chamber, thus risking offsetting the image sensing IC from the lens module, which may result in poor image quality. To release the gas in the chamber, an outgassing hole must be defined in the objective holder. Conventionally, the hole is defined in a peripheral wall of the chamber adjacent to the barrel, which also contributes to the bulkiness of the objective holder.

What is needed, therefore, is an objective holder which has a compact configuration.

SUMMARY

In accordance with a present embodiment, an objective holder engages with a PCB substrate having an image sensor and several passive components arranged thereon. The passive components surround the image sensor. The objective holder includes a lens barrel extending perpendicularly from one side of a base, and a plurality of walls perpendicularly extending from an opposite side of the base. The walls enclose a chamber thereamong for receiving the image sensor and define notches therein for receiving the passive components therein. A transparent cover is received in the objective holder between the lens barrel and the chamber. An adhesive is used to connect the objective holder to the PCB substrate. The PCB substrate contacts the walls. At least one of the notches communicates the chamber to an exterior for outgassing and is sealed by a mass of sealing material after a heating process of the adhesive.

Other advantages and novel features will be drawn from the following detailed description of at least one preferred embodiment, when considered in conjunction with the attached drawings.

BRIEF DESCRIPTION OF THE DRAWINGS

Many aspects of the present objective holder can be better understood with reference to the following drawings. The components in the drawings are not necessarily drawn to scale, the emphasis instead being placed upon clearly illustrating the principles of the present objective holder. Moreover, in the drawings, like reference numerals designate corresponding parts throughout the several views.

DETAILED DESCRIPTION OF THE PREFERRED EMBODIMENTS

Embodiments of the present objective holder will now be described in detail below and with reference to the drawings.

Figure 1:
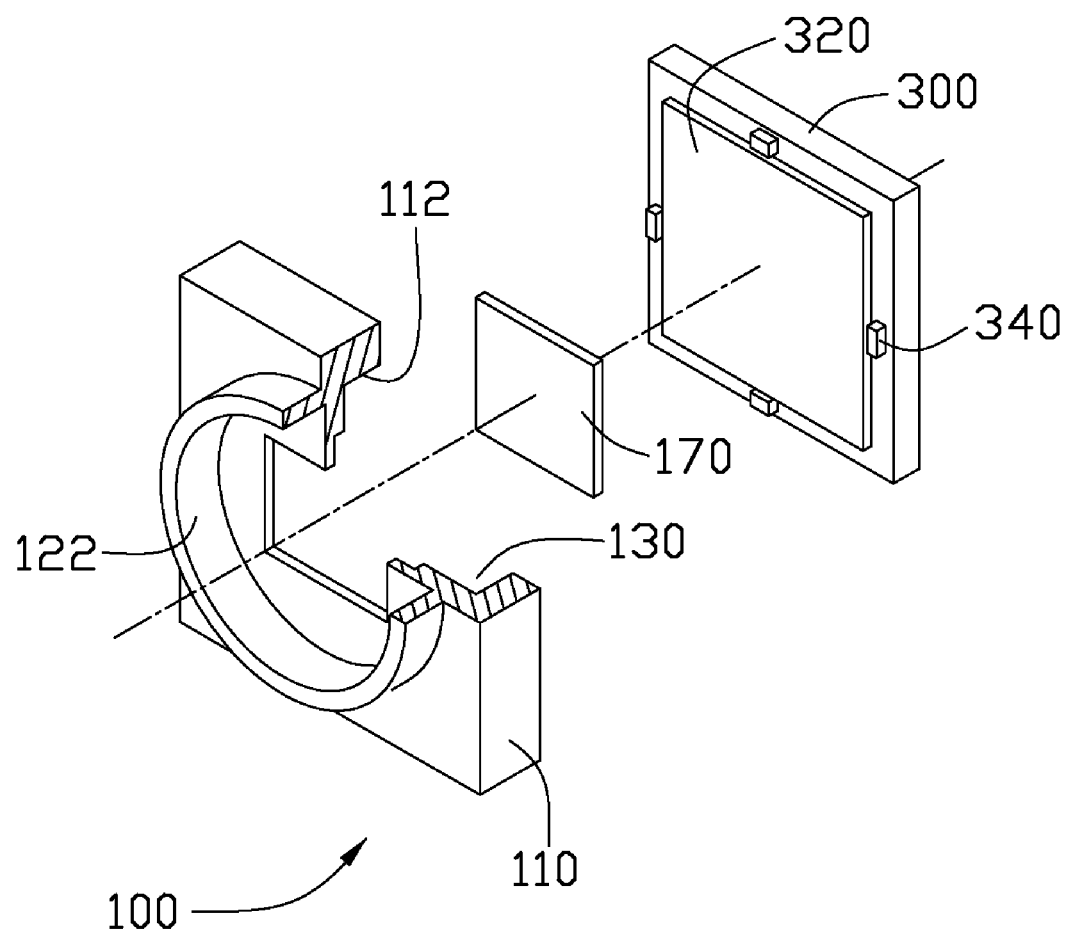
FIG. 1 is an exploded, isometric view of an objective holder and a PCB substrate with an image sensor and several passive components arranged thereon, wherein the objective holder is partially cut away for clear illustration.
Figure 2:
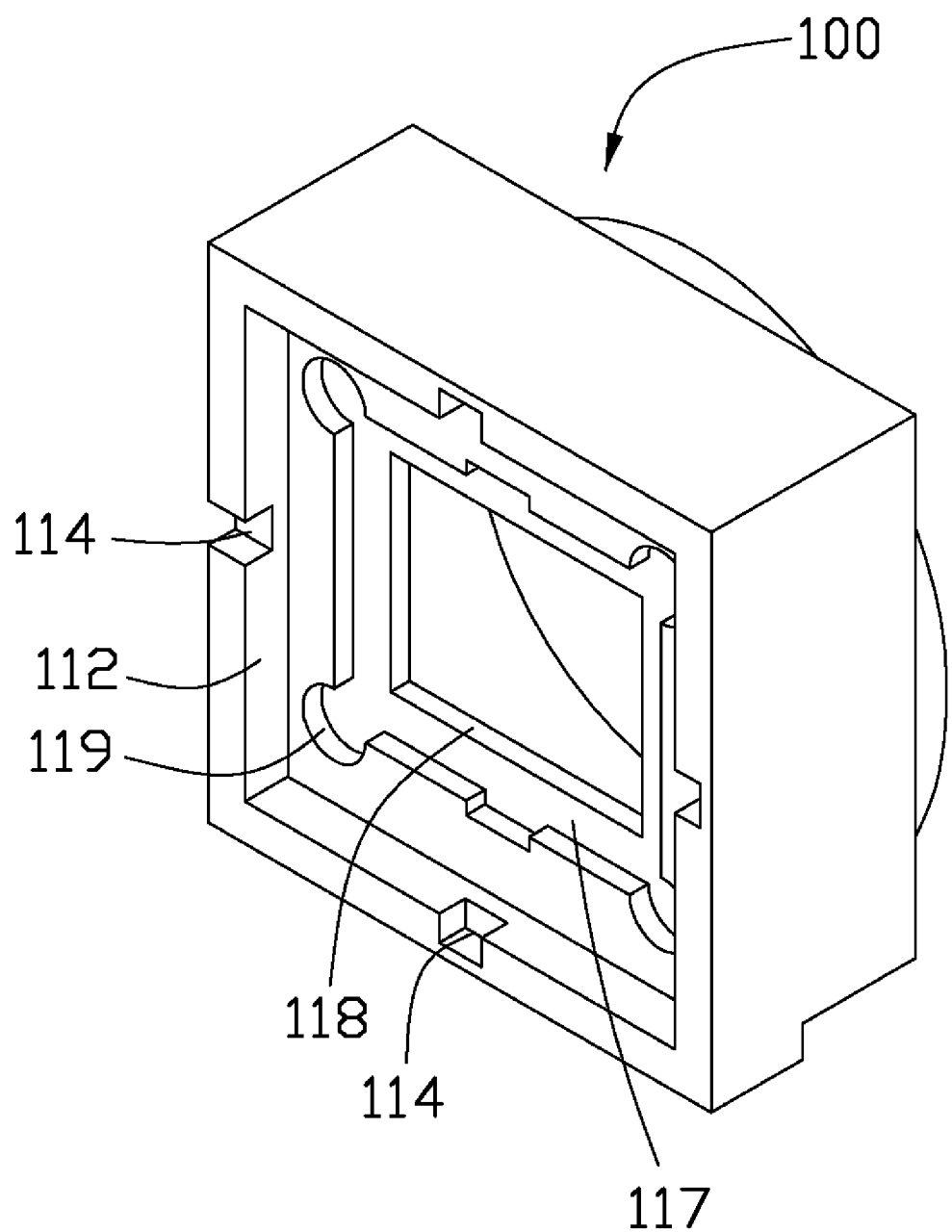
FIG. 2 is an enlarged, isometric view of the objective holder of FIG. 1, but viewed from a different angle.
Figure 3:
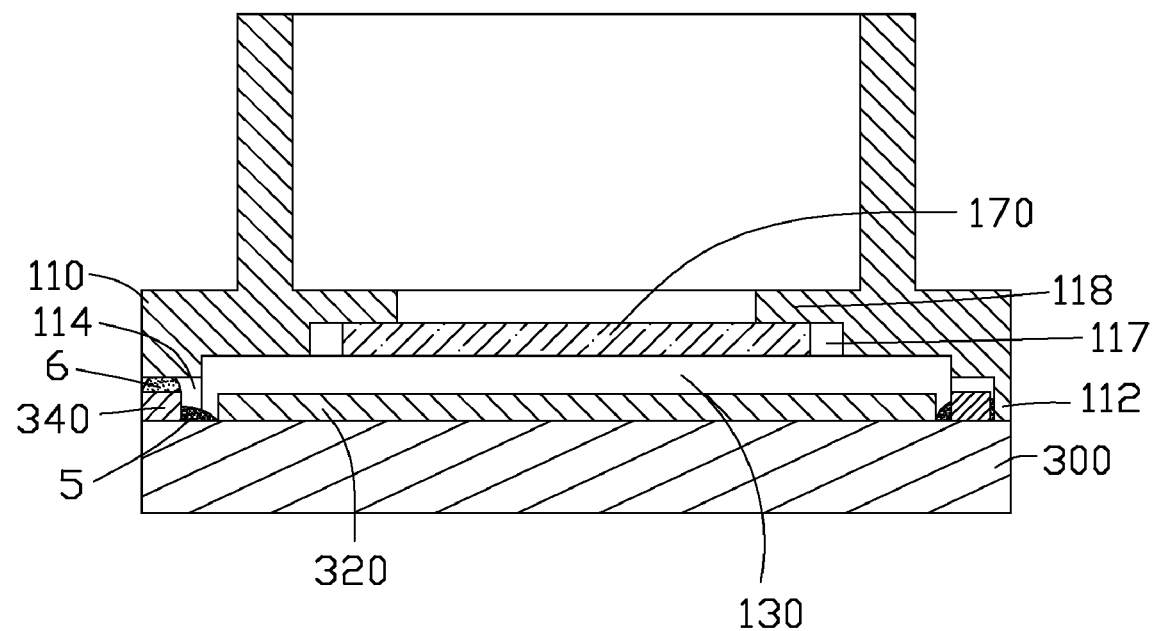
FIG. 3 is a cross-sectional view of an assembly of the objective holder and the PCB substrate of FIG. 1.

Referring to FIGS. 1-3, an objective holder 100 in the first embodiment may be engaged with a printed circuit board (PCB) substrate 300. An image sensor 320 and four passive components 340 are arranged on the PCB substrate 300. The passive components 340 surround the image sensor 320. The image sensor 320 may be a charge coupled device (CCD) image sensor or a complementary metal oxide semiconductor (CMOS) image sensor. The passive components 340 may be capacitors, inductors, or resistors.

The objective holder 100 comprises a base 110, a lens barrel 122, and four walls 112. The lens barrel 122 and the four walls 112 oppositely extend from the base 110. The lens barrel 122 is for receiving a lens module (not shown). The lens module (not shown) can be secured in the lens barrel 122 by any conventional means. The walls 112 are contiguous and cooperatively enclose a chamber 130 thereamong. The chamber 130 is for receiving the image sensor 320 on the PCB substrate 300. The lens barrel 122 and the chamber 130 are coaxially aligned so that optical cores of the lens module (not shown) and the image sensor 320 are aligned for promoting precise imaging.

Particularly referring to FIGS. 2-3, four notches 114 are defined in the walls 112 respectively and communicate with the chamber 130, for receiving the passive components 340 therein respectively. In the embodiment, each notch 114 is located at a center portion of the corresponding wall 112, in accordance with a location of the corresponding passive component 340. When the PCB substrate 300 is placed to objective holder 100, the PCB substrate 300 contacts the walls 112. The passive components 340 are correspondingly received in the notches 114 defined in the walls 112. The image sensor 320 is received in the chamber 130. Since the passive components 340 do not occupy the chamber 130 but the notches in the walls 112, the chamber 130 is just for receiving the image sensor 320 and is more compact than a chamber used for receiving both the image sensor 320 and the passive components 340. For the objective holder 100 as a whole, space that would normally be occupied by the passive components can be saved compared to the above-mentioned reference. Thus, the objective holder 100 has a compact configuration.

Referring still to FIGS. 1-3, one of the notches 114 extends through the corresponding wall 112 to communicate the chamber 130 to an exterior via a portion of the wall not contacting the PCB substrate 300. A flange 118 extends inwardly from the base 110, between the lens barrel 122 and the chamber 130. A square room 117 is defined in the base 110 adjacent to the chamber 130 but smaller than the chamber 130, for receiving a transparent cover 170, which abuts against the flange 118 (see FIG. 3). Four holes 119 are defined in the base 100 communicating with the room 117 for allowing sealing material to be placed in the room 117. In the embodiment, the holes 119 communicate with corners of the room 117.

Particularly referring to FIG. 3, depths of the notches 114 are larger than heights of the passive components 340. An adhesive 5 is utilized between the PCB substrate 300 and the objective holder 100 to assemble the PCB substrate 300 and the objective holder 100 together. The adhesive 5 is also filled in the notches 114 but the notch 114, which communicates the chamber 130 to the exterior, is sealed by a mass of sealing material 6 after the adhesive 5 is heated. Therefore, the notch 114, which communicates the chamber 130 to the exterior, here also functions as an outgassing hole for the objective holder 100.

Figure 4:
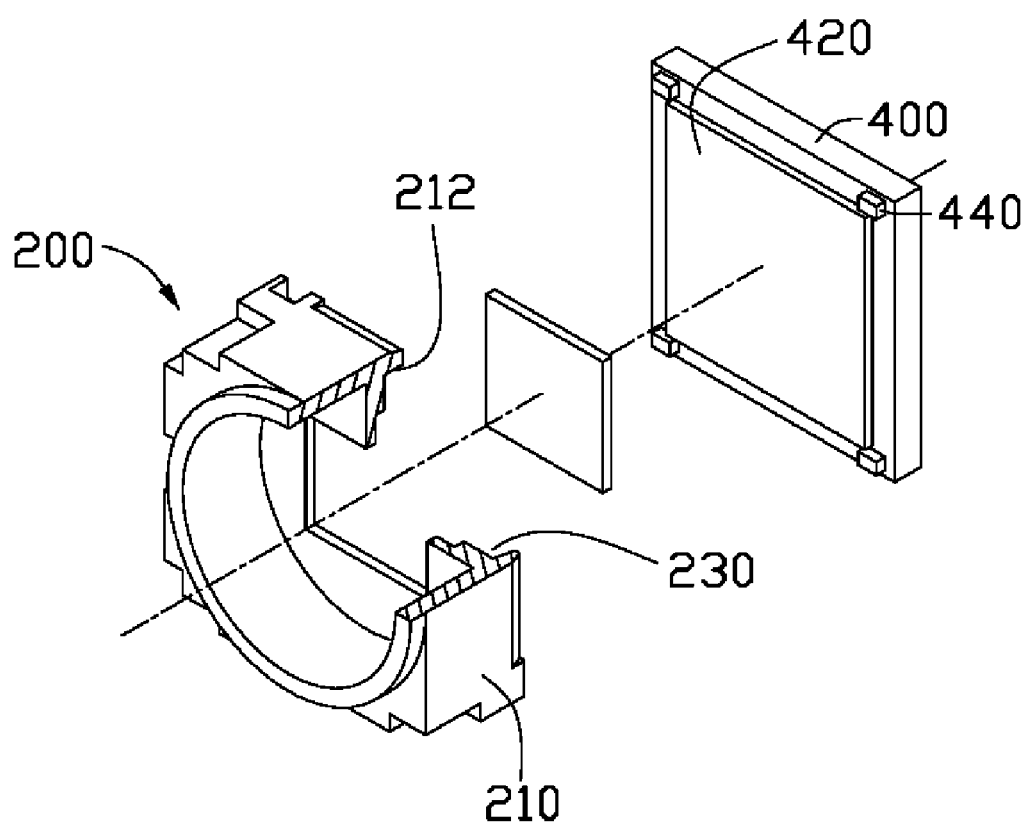
FIG. 4 is an exploded, isometric view of an alternative objective holder and a PCB substrate with an image sensor and several passive components arranged thereon, wherein the objective holder is partially cut away for clear illustration.
Figure 5:
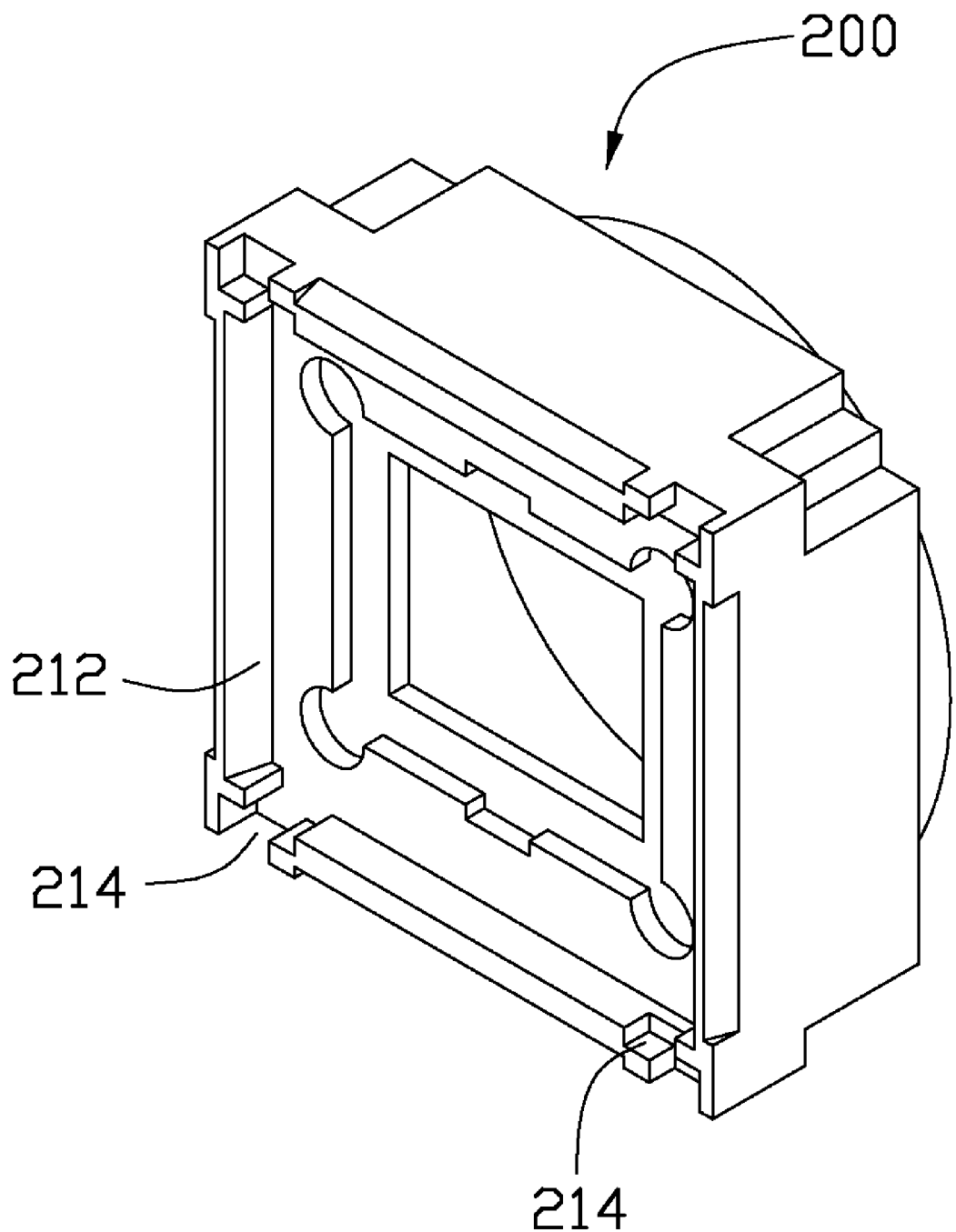
FIG. 5 is an enlarged, isometric view of the objective holder of FIG. 4, but viewed from a different angle.
Figure 6:
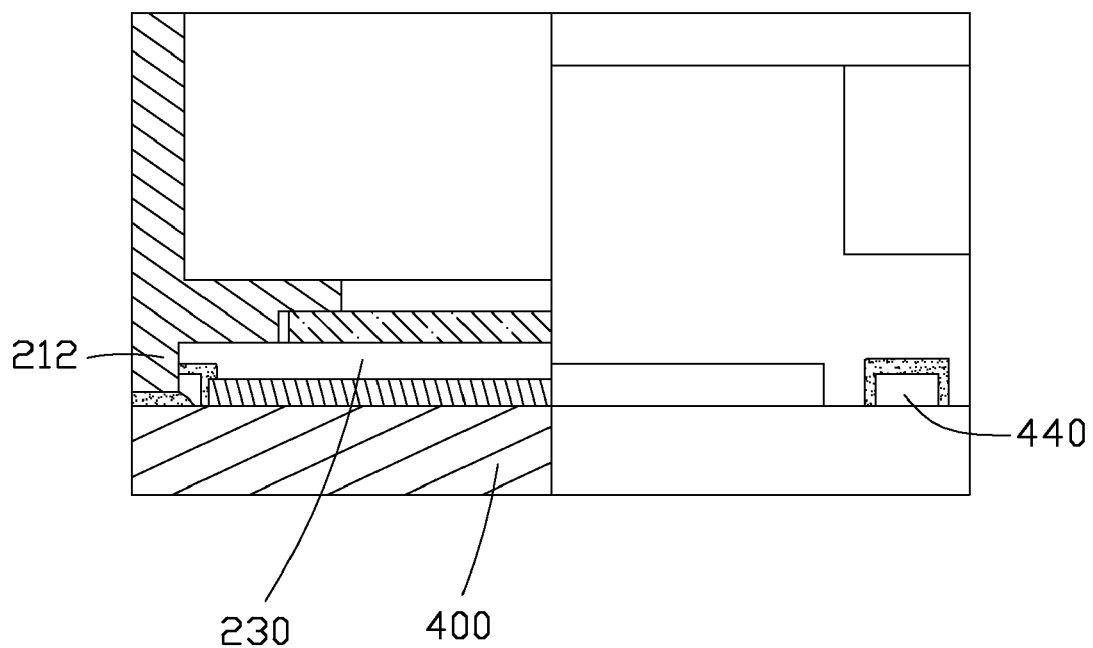
FIG. 6 is a side plan view of an assembly of the objective holder and the PCB substrate of FIG. 4, where the assembly is partially cut away for clear illustration.

Referring to FIGS. 4-6, in an objective holder 200 of a second embodiment, notches 214 are respectively defined at joints of adjacent walls 212, allowing the passive components 440 to be arranged at four corners of a PCB substrate 400 surrounding the image sensor 420. Each notch 214 communicates the chamber 230 to an exterior and functions as an outgassing hole. It is feasible for the walls 212 to be made thinner than the parts where the notches 214 are defined so as to save material and lighten the objective holder 200. Other features such as a base 210 and a chamber 230 of the objective holder 200 in the second embodiment may be referenced from the description of the objective holder 100 in the first embodiment.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. An objective holder for engaging with a PCB substrate, the PCB substrate having an image sensor and a plurality of passive components arranged thereon, the objective holder comprising:

a base, a lens barrel extending from a side of the base; and a plurality of walls extending from an opposite side of the base, the walls enclosing a chamber thereamong for receiving the image sensor and defining notches therein for receiving the passive components, at least one of the notches communicating the chamber to an exterior for outgassing.

2. The objective holder as claimed in claim 1, wherein a flange extends inwardly from the base, between the barrel and the chamber.

3. The objective holder as claimed in claim 2, wherein a room is defined in the base adjacent to the chamber, and wherein a transparent cover is received in the room and abuts against the flange.

4. The objective holder as claimed in claim 3, wherein the room is smaller than the chamber.

5. The objective holder as claimed in claim 3, wherein a plurality of holes are defined in the base communicating with the room to allow sealing material to be placed in the room.

6. The objective holder as claimed in claim 5, wherein the holes communicate with corners of the room.

7. A combination comprising:

a PCB substrate with an image sensor and a plurality of passive components thereon, the passive components surrounding the image sensor;

an objective holder comprising a lens barrel and a plurality of walls opposite to the lens barrel, the walls enclosing a chamber thereamong and defining notches therein, the chamber receiving the image sensor, the notches receiving the passive components therein, the PCB substrate contacting the walls and at least one of the notches communicating the chamber to an exterior for outgassing;

a transparent cover received in the objective holder between the lens barrel and the chamber;

an adhesive connecting the objective holder to the PCB substrate; and at least one mass of sealing material sealing the at least one of the notches after a heating process of the adhesive.

8. The combination as claimed in claim 7, wherein a flange extends inwardly from the objective holder, between the barrel and the chamber.

9. The combination as claimed in claim 8, wherein a room is defined in the objective holder adjacent to the chamber, and wherein the transparent cover is received in the room and abuts against the flange.

10. The combination as claimed in claim 9, wherein the room is smaller than the chamber.

11. The combination as claimed in claim 9, wherein a plurality of holes are defined in the base communicating with the room to allow sealing material to be placed in the room.

12. The combination as claimed in claim 11, wherein the holes communicate with corners of the room.

13. The combination as claimed in claim 7, wherein depths of the notches are larger than heights of the passive components.

* * * * *